June 7, 1949.  L. R. NIXON  2,472,545
APPARATUS FOR TESTING VOLTAGE REGULATORS
Filed Nov. 24, 1944  2 Sheets-Sheet 1

Inventor
Leslie R. Nixon
by Sommers + Young
Attorneys

Patented June 7, 1949

2,472,545

UNITED STATES PATENT OFFICE 2,472,545

APPARATUS FOR TESTING VOLTAGE REGULATORS

Leslie Reginald Nixon, New Eltham, London, England, assignor to J. Stone & Company Limited, Deptford, England, a British joint-stock company Application November 24, 1944, Serial No. 565,036
In Great Britain March 13, 1944

4 Claims. (Cl. 73—1)

This invention relates to improvements connected with apparatus for testing electric regulators of the carbon pile type and has for its object to provide a simple and reliable testing means for use in re-setting that class of regulator wherein compression of the pile is increased by electro-magnetic action.

In the usual carbon pile regulator, the pile is normally held in compression by a control spring and the electro-magnet is so arranged in relation to the pile and spring that excess current applied causes it to overcome the pull of the spring and thereby to relieve the compression of the pile. For such regulators, pile adjusters and indicators have been provided, whereby, during service, the pile could be renewed or repaired and then readily adjusted so as to receive the original correct setting given to it on the test bench.

In some circumstances, it becomes necessary to employ a regulator wherein the pile is normally under minimum compression and is additionally compressed against the action of a control spring as the energization of the electro-magnet increases, and this is the condition obtaining in the case of some pilot regulators. In such regulators, magnet torque=spring torque+pile reaction torque.

According to this invention in a regulator wherein pile compression is increased by electro-magnetic action, there are provided testing means comprising in combination spring means of predetermined value adapted for applying compression to the pile when the regulator magnet is de-energized and indicator means adapted for indicating the setting of the pile when under the compressive influence of the said spring means. An indicator suitable for this purpose is disclosed in United States patent to Chilton et al. No. 2,374,417, dated April 24, 1945.

The spring means may be applied so as to oppose and overcome the control spring which is normally operative in the direction of pile decompression. Or, the control spring may be readily detachable or disengageable so as to permit the force of the spring means of known value to be applied for compressing the pile during the testing or re-setting operation.

In order to enable the invention to be readily understood, reference is made to the accompanying drawings wherein.

Figure 1:
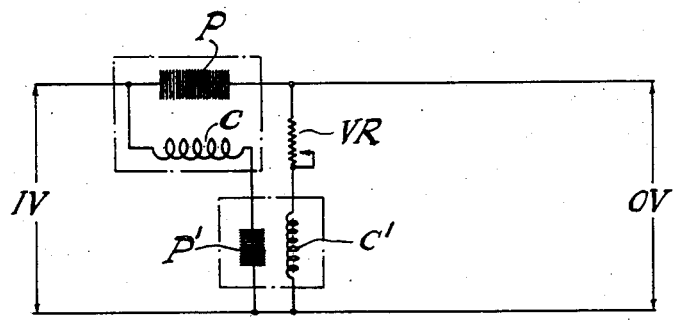
Figure 1 is a diagram illustrating how a carbon pile regulator, in which the magnet operates to compress the pile, may operate in a circuit as a pilot regulator.

Referring to Figure 1, P indicates the pile of a regulator for regulating the output voltage OV of a circuit, IV being the input voltage. In this regulator, the magnet coil C which is affected by the input voltage becomes operative for de-compressing the pile P in the usual manner. The coil C, however, is in series with a pile P$^1$ of a pilot regulator, the coil C$^1$ of the latter being connected across the output voltage in series with a variable resistance VR. The coil C$^1$ of the pilot regulator operates in a reverse manner compared with the coil C for it becomes effective when energized for variably compressing the pile P$^1$. In such an installation, the main regulator C, P may be a comparatively crude piece of apparatus and the accuracy of the regulated voltage is controlled completely by the pilot regulator C$^1$, P$^1$.

Figures 2, 5:
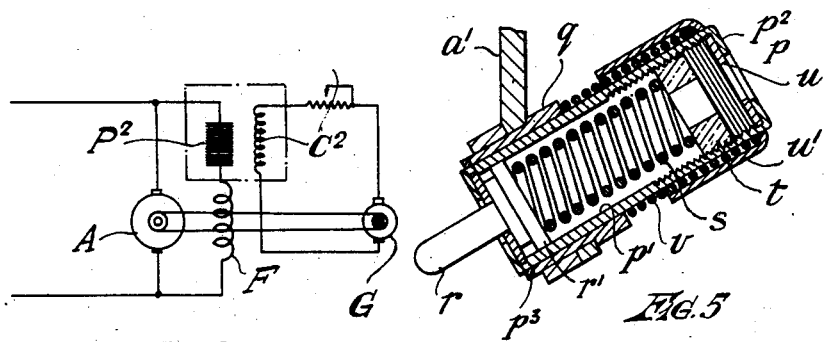
Figure 2 is a diagram illustrating how a carbon pile regulator, in which the magnet operates to compress the pile, may be used in connection with the field circuit of a D. C. motor.
Figure 5 is a sectional view to a larger scale of a press button testing device seen in Figures 3 and 4.

Referring to Figure 2, A is the armature and F is the field winding of a D. C. motor, the carbon pile P$^2$ of a regulator being inserted in the field winding circuit. The pile P$^2$ is variably compressed by a magnet energized by a coil C$^2$ and operating against a spring which tends constantly to de-compress the pile P$^2$. The coil C$^2$ of this regulator may be excited by a tachometer generator G mechanically driven from the motor and sensitive to speed changes. With this arrangement, any increase of speed over the required value causes the coil C$^2$ to produce additional compression of the pile P$^2$, thereby increasing the motor field strength and restoring the correct speed value.

The foregoing are two examples of circuits in which an electric regulator embodying the present improvements may be employed.

Figure 3:
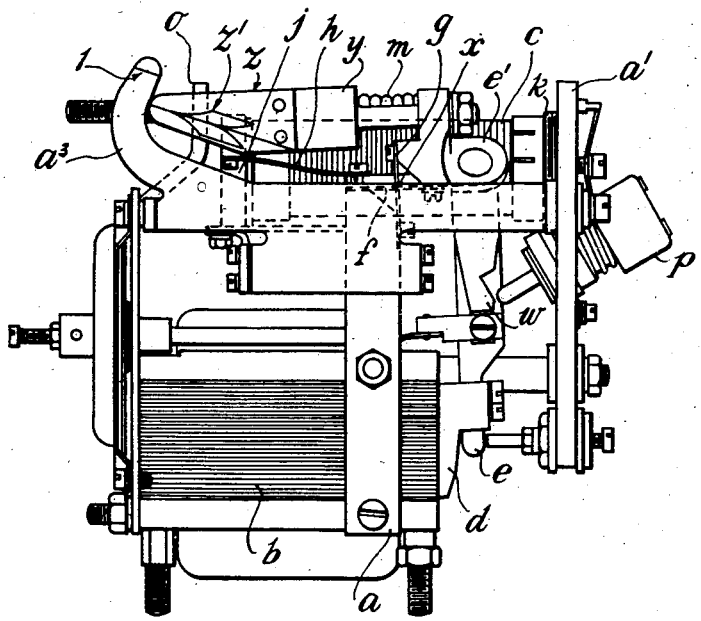
Figure 3 is a side elevation and Figure 4 is a plan view of a known kind of carbon pile regulator embodying the present improvements.
Figure 4:
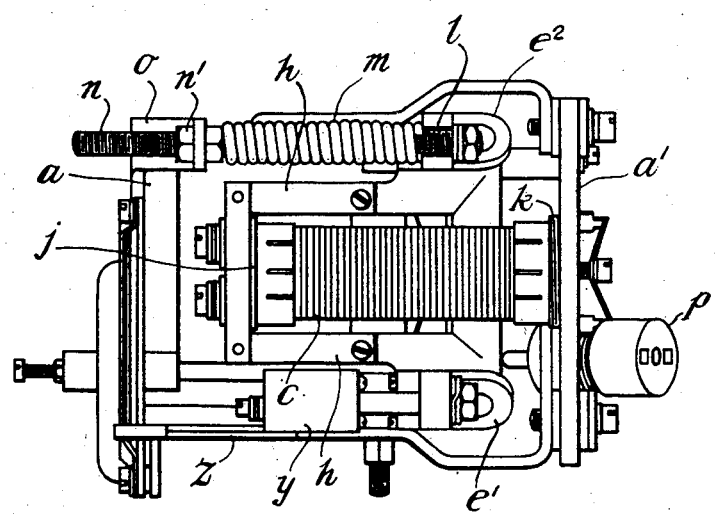

Referring to Figures 3 and 4, $a$ is the framing of an electric regulator of known kind comprising a magnet $b$ and a carbon pile $c$. The armature $d$ is a piece of iron of U-section as seen end on presenting two blades for attraction into polar gaps of the magnet $b$ in known manner. The armature $d$ is straddled and fixed on the stem $e$ of a Y-shaped casting serving as carrier, the two divergent branches of which are marked $e^1$ and $e^2$ respectively. This carrier is supported pivotally in known manner and substantially frictionlessly by means of horizontal and vertical spring blades $f$ and $g$, Figure 3, each having one end affixed to the frame $a$ and the other end affixed to suitably shaped projections formed on the branches $e^1$, $e^2$ of the carrier (cf. also Figure 6). A pivotal axis is thus provided at the intersection $x$ between the blades $f$ and $g$ in known manner. The armature piece $d$ is thus carried at the end of a long lever arm extending downwardly beneath the pivotal axis $x$ in Figure 3. As regards the short arm of the lever provided by the branches $e^1$, $e^2$ extending above the pivotal axis $x$ these are connected by flexible connectors such as short steel tapes $h$, Figures 3 and 4, with a presser ring $j$ which is operative against the movable end of the pile $c$. The opposite end of the pile $c$ is abutted against a screw threaded abutment $k$ which is adjustable in a plate $a^1$ of the framing. The branch $e^2$ of the carrier is slotted at its extremity and the slotted end is engaged by a screw stud $l$, Figure 4, connected with one end of a spring $m$, the other end of the spring being connected with a screw $n$ which is adjustably fixed by nuts $n^1$ in a bimetallic strip $o$ affixed to the framing $a$.

The regulator above described works in the following manner: With the magnet $b$ de-energized, the spring $m$ acting on the short arm of the aforesaid lever turns the carrier $e$, $e^1$, $e^2$, counter-clockwise about the pivot axis $x$, thereby withdrawing the armature $d$ from the polar gaps of the magnet $b$ and relaxing the connectors $h$ so that the pile $c$ is decompressed. The slack state of the connectors $h$, in this condition of the parts is to be seen in Figure 3. When the magnet $b$ is energized sufficiently the attraction of the armature $d$, which is on the long arm of the lever, overcomes the effort of the spring acting upon the short arm and the carrier $e$, $e^1$, $e^2$ is thus turned clockwise about the pivotal axis $x$. The result is that the connectors $h$ are put under tension and the presser ring $j$ is pulled more or less strongly against the movable end of the pile $c$ to put the latter under variable compression.

The present improvements, according to one example, provide in a regulator of the kind above described and in conjunction with the long lever arm of the carrier $e$, $e^1$, $e^2$, a press button device indicated generally by the letter $p$ in Figures 3 and 4 and shown in detail in Figure 5. Referring to Figure 5, the press-button device $p$ comprises a cylindrical casing $p^1$ which is slidable in a socket $q$ fixedly mounted in the frame plate $a^1$. The stem $r$ of a plunger $r^1$ protrudes through a hole in one end cover of the casing $p^1$ and is normally pressed outwardly to the full extent shown by a calibrated spring $s$ operating between the plunger $r^1$ and an abutment ring $t$ screwed into the other end of the casing. This end of the casing is fitted with a perforated cap $u$ which is fastened to the casing $p^1$ by tags $p^2$ on the latter which are passed through slots in the cap $u$ and bent over as shown. A light spring $v$ constantly presses the casing $p^1$ rightwardly and upwardly in Figure 5 and for this purpose it reacts between one end of the socket $q$ and the cap $u$, the latter being formed with a skirt $u^1$ which partly encloses the spring $v$ and which also serves as a stop when the casing $p^1$ is pressed leftwards and downwards as hereinafter explained. The rightward upward movement of the casing $p^1$ under the influence of the spring $v$ is limited by a stop flange $p^3$ on the casing coming against the inner end of the socket $q$ as shown.

Normally, the press button devise occupies the position seen in Figure 3, wherein the stem $r$ of its plunger is seen to be out of contact with a shaped part $w$ on the pivotal carrier $e$, $e^1$, $e^2$. When a test or re-setting operation is to be performed on the regulator, the magnet $b$ is de-energized so that the parts may occupy the position seen in Figure 3. The casing $p^1$ of the press button is then pressed inwards against the action of the spring $v$ until arrested by the skirt $u^1$ coming against the outer end of the socket $q$. This pressing in of the button first brings the stem $r$ of the plunger against the shaped part $w$ which presents an abutment surface perpendicular to the axis of the stem $r$. Thereafter, and during the pressing in of the casing $p^1$ to its full limit, the internal calibrated spring $s$ becomes compressed to a predetermined degree. The spring $s$ is calibrated so that when compressed in the manner described it overcomes the pull of the main control spring $m$ acting on the short lever arm and applies a predetermined compressive force to the pile $c$. To indicate the effect of the press button operation an indicator device is required. This may be provided in the following manner: On the branch $e^1$ of the carrier there is fixedly mounted a known counterbalance weight $y$, Figures 3 and 4, and this weight serves conveniently for the mounting of a pointer in the form of a light finger $z$ of sheet metal bearing an arrow head $z^1$, Figure 3. Opposite this pointer there is a curved extension $a^3$ of a frame plate and such extension is provided with a scale or with a single mark $l$ as shown. Now, when the press button is pressed in as above described, it causes the carrier $e$, $e^1$, $e^2$ to turn about the axis $x$, as explained. Consequently, the weight $y$ and pointer $z$ move with the carrier, the pointer $z$ moving in indicative relation with the extension $a^3$. If the pile $c$ is in correct adjustment, the arrow $z^1$ on the pointer will come into alignment with the mark $l$ on the extension $a^3$, or opposite a given mark on a scale if one is provided. If, on the other hand, the pile is in incorrect adjustment, the arrow $z^1$ will show a deviation from the mark $l$. The setting can then be adjusted by operating the abutment screw $k$ which adjusts the pile bodily one way or the other, until the arrow $z^1$ registers accurately with the mark $l$ when it will be known that the setting of the pile has been corrected.

Figures 6, 7:
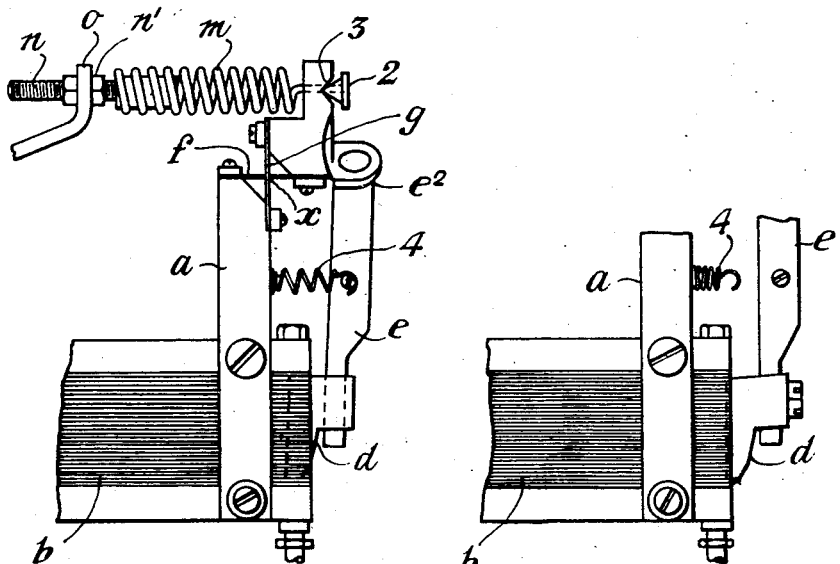
Figure 6 is a fragmental side elevation illustrating a modification.
Figure 7 is similar to a portion of Figure 6 but showing a further modification.

According to a modification illustrated in Figure 6, the main control spring $m$ of the regulator is detachably connected with the short lever arm if the carrier $e$, $e^2$, for example by fitting it at the appropriate end with a knife edge bearing device 2 which is disengageable from a V-seating 3 on the branch $e^2$. The long arm of the lever has connected with it one end of a relatively light spring 4 having its other end connected with the frame part $a$. The spring 4 always tends to assist the magnet $b$ as will be understood from Figure 6 which shows the armature piece $d$ attracted into the polar gaps, the magnetic attraction having overcome the main control spring $m$ in order to put the pile under compression as hereinbefore explained. With this arrangement, when the regulator is to be tested or re-set, the magnet $b$ is de-energized and the knife edge device 2 is disengaged from the V-seating 3. The carrier or two armed lever $e$, $e^2$ is now subjected only to the forces of pile reaction and the effort of the relatively light spring 4 tending to compress the pile. The spring 4 is carefully calibrated before being fitted so that a predetermined compression of a correctly set pile will be attained under the action of the spring 4. If the pile is in correct adjustment this will be shown by indicator means such as that hereinbefore described and if the pile is in incorrect adjustment, it must be adjusted in the manner described until the indicator shows that a correct setting has been achieved.

According to the further modification illustrated in Figure 7, the spring 4 is detachable from the stem $e$ of the carrier so that it does not normally assist the magnet $b$ but remains idle and relaxed. In Figure 7 the parts are shown in the position occupied when the magnet $b$ is de-energized. A test is made when the magnet is de-energized by detaching the main control spring $m$ from the carrier, as explained with reference to Figure 6, and attaching the spring 4 to the stem $e$ of the carrier. A testing operation with the arrangement in Figure 7 then proceeds in precisely the same manner as described with reference to Figure 6.

I claim:

1. In a testing device for electric regulators of the carbon pile type wherein compression of the pile is effected by a magnet operating against a main spring; a casing, a spring-loaded plunger enclosed in said casing, a frame for the regulator having a fixed slideway in which said casing is guidingly mounted and depressible therein for bringing said plunger into resilient engagement with a movable part of the regulator in opposition to said main spring, and stop means limiting the depression of said casing and the ultimate spring load on said plunger.

2. In a testing device for electric regulators as claimed in claim 1, a return spring normally operative for supporting said casing in a withdrawn and inoperative position, and stop means for limiting the return movement of said casing under the action of said return spring.

3. In a testing device for electric regulators of the carbon pile type wherein compression of the pile is effected by a magnet operating against a main spring; said testing device comprising a calibrated spring, a casing enclosing said calibrated spring, a plunger slidable inwardly of said casing against the action of said calibrated spring, stop means on said casing for arresting movement of said plunger outwardly of said casing, a framing for the regulator, guide means fixedly disposed in the framing of the regulator and slidably supporting said casing whereby the latter can be moved towards and from a movable part of the regulator, a rod on said plunger normally projecting from said casing for resilient engagement with a movable part of the regulator during forward sliding movement of said casing and stop means limiting said forward sliding movement.

4. In a testing device for electric regulators as claimed in claim 3, a return spring normally operative on said casing for pressing the latter back in said guide means, and a stop adapted for limiting return movement of said casing under the action of said return spring.

LESLIE REGINALD NIXON.

REFERENCES CITED

The following references are of record in the file of this patent:

UNITED STATES PATENTS

| Number | Name | Date |
|---|---|---|
| 1,600,176 | Humphrey | Sept. 14, 1926 |
| 1,825,491 | Walters | Sept. 29, 1931 |
| 1,842,323 | Gluzek | Jan. 19, 1932 |
| 1,857,149 | Grob | May 10, 1932 |
| 1,946,774 | Wilms | Feb. 13, 1934 |
| 2,374,417 | Chilton et al. | Apr. 24, 1945 |